United States Patent [19]
Huang

[11] Patent Number: 5,988,514
[45] Date of Patent: Nov. 23, 1999

[54] APPARATUS FOR CONTROLLING FLUID TEMPERATURE

[76] Inventor: Tien-Tsai Huang, No. 4, Lane 30, Wu-Chuan St., Pan-Chiao City, Taipei Hsien, Taiwan

[21] Appl. No.: 09/006,107

[22] Filed: Jan. 13, 1998

[51] Int. Cl.$^6$ ................................................ G05D 23/13
[52] U.S. Cl. .................... 236/12.14; 236/12.2; 236/93 A
[58] Field of Search ............................. 236/12.14, 12.16, 236/12.2, 12.21, 93 R, 93 A

[56] References Cited

U.S. PATENT DOCUMENTS

| | | | |
|---|---|---|---|
| 2,326,096 | 8/1943 | Dillman | 236/12.14 |
| 2,599,699 | 6/1952 | Dilworth et al. | 236/12.14 |
| 4,190,198 | 2/1980 | Casuga et al. | 236/93 A |
| 5,127,237 | 7/1992 | Sendo et al. | 236/928 |
| 5,271,559 | 12/1993 | Naujock | 236/93 A |

*Primary Examiner*—William E. Tapolcai
*Attorney, Agent, or Firm*—Fish & Richardson P.C.

[57] ABSTRACT

A fluid temperature control apparatus includes a housing with first and second housing portions, and a partition for isolating the first and second housing portions. The first housing portion has a first fluid inlet connected to a hot fluid source, and a first fluid outlet. The second housing portion has a second fluid inlet connected to a cold fluid source, and a second fluid outlet connected to the first fluid inlet. A valve assembly includes a tubular valve seat disposed in the second housing portion to define a piston receiving space with an open end that is spaced from the partition and that is communicated with the second fluid outlet. A piston has a head portion extending slidably into the piston receiving space, and a restricted actuated portion extending out of the open end of the valve seat. The valve seat has a radial valve opening communicated with the second fluid inlet. The piston is movable between a first position, where the head portion blocks the valve opening, and a second position, where the head portion ceases to block the valve opening. A temperature responsive member is mounted on the partition, and has a fluid contacting portion disposed in the first housing portion, and a volume-variable piston actuating portion connected to the actuated portion of the piston and disposed in the second housing portion.

12 Claims, 7 Drawing Sheets

APPARATUS FOR CONTROLLING FLUID TEMPERATURE

BACKGROUND OF THE INVENTION

1. Field of the Invention

The invention relates to an apparatus for controlling fluid temperature, more particularly to an apparatus which is capable of controlling hot and cold fluid flow so that the mixed fluid discharge therefrom can be kept at an appropriate temperature.

2. Description of the Related Art

A conventional apparatus for controlling fluid temperature includes a manually operable fluid flow adjustment mechanism on a housing. The housing includes a first inlet portion adapted to be connected to a hot fluid source, a second inlet portion adapted to be connected to a cold fluid source and an outlet portion for discharging a mixture of the hot and cold fluid from the first and second inlet portions. After testing the temperature of the mixed fluid flowing through the outlet portion, the fluid flow adjustment mechanism can be operated to control the flow of hot and cold fluid to the outlet portion, thereby adjusting the temperature of the mixed fluid through the outlet portion.

It is noted that the conventional apparatus does not permit pre-setting of the temperature of the fluid discharged from the outlet portion, thereby resulting in inconvenience to the user. Even if the ratio of the hot fluid flow to cold fluid flow can be preset, the temperature of the mixed fluid is not presettable due to unstable hot and cold fluid temperatures, which are easily affected by ambient temperature.

SUMMARY OF THE INVENTION

The main object of this invention is to provide a fluid temperature control apparatus which can be preset so that the fluid discharged therefrom can be kept at an appropriate temperature.

Accordingly, the apparatus for controlling fluid temperature of this invention includes a housing, a valve assembly, and a temperature responsive member. The housing includes a first housing portion, a second housing portion, and a partition for isolating the second housing portion from the first housing portion. The first housing portion has a first fluid inlet that is adapted to be connected to a hot fluid source, and a first fluid outlet for releasing fluid therefrom. The second housing portion has a second fluid inlet that is adapted to be connected to a cold fluid source, and a second fluid outlet connected to the first fluid inlet of the first housing portion. The valve assembly includes a tubular valve seat and a piston. The valve seat is disposed in the second housing portion and is formed with an axially extending piston receiving space with an open end that is spaced from the partition and that is fluidly communicated with the second fluid outlet of the second housing portion. The piston has an enlarged head portion that extends slidably into the piston receiving space of the valve seat, and a restricted actuated portion that extends out of the valve seat via the open end of the valve seat. The valve seat has a radial valve opening that is fluidly communicated with the second fluid inlet of the second housing portion. The piston is movable relative to the valve seat between a first position, where the head portion blocks fully the valve opening of the valve seat so as to be adapted to prevent cold fluid from the cold fluid source from flowing into the second fluid outlet, and a second position, where the head portion ceases to block the valve opening so as to be adapted to permit maximum cold fluid flow from the cold fluid source to the second fluid outlet via the open end of said valve seat. The temperature responsive member is mounted on the partition, and has a fluid contacting portion that extends into the first housing portion, and a volume-variable piston actuating portion that extends into the second housing portion and that is connected to the actuated portion of the piston. The piston actuating portion is capable of expanding so as to move the piston relative to the valve seat by a distance corresponding to the temperature of fluid entering into the first housing portion via the first fluid inlet for controlling the cold fluid flow through the second fluid outlet and into the first housing portion to control, in turn, the temperature of fluid that flows out of the first fluid outlet.

Preferably, the second housing portion is formed with a tubular valve seat retainer therein so as to receive slidably and sealingly the valve seat in the valve seat retainer. The valve seat retainer is preferably formed with a radial inlet port that communicates fluidly the valve opening and the second fluid inlet of the second housing portion.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENTS

Before the present invention is described in greater detail, it should be noted that same reference numerals will be used to denote the same elements throughout the specification.

Figure 1:
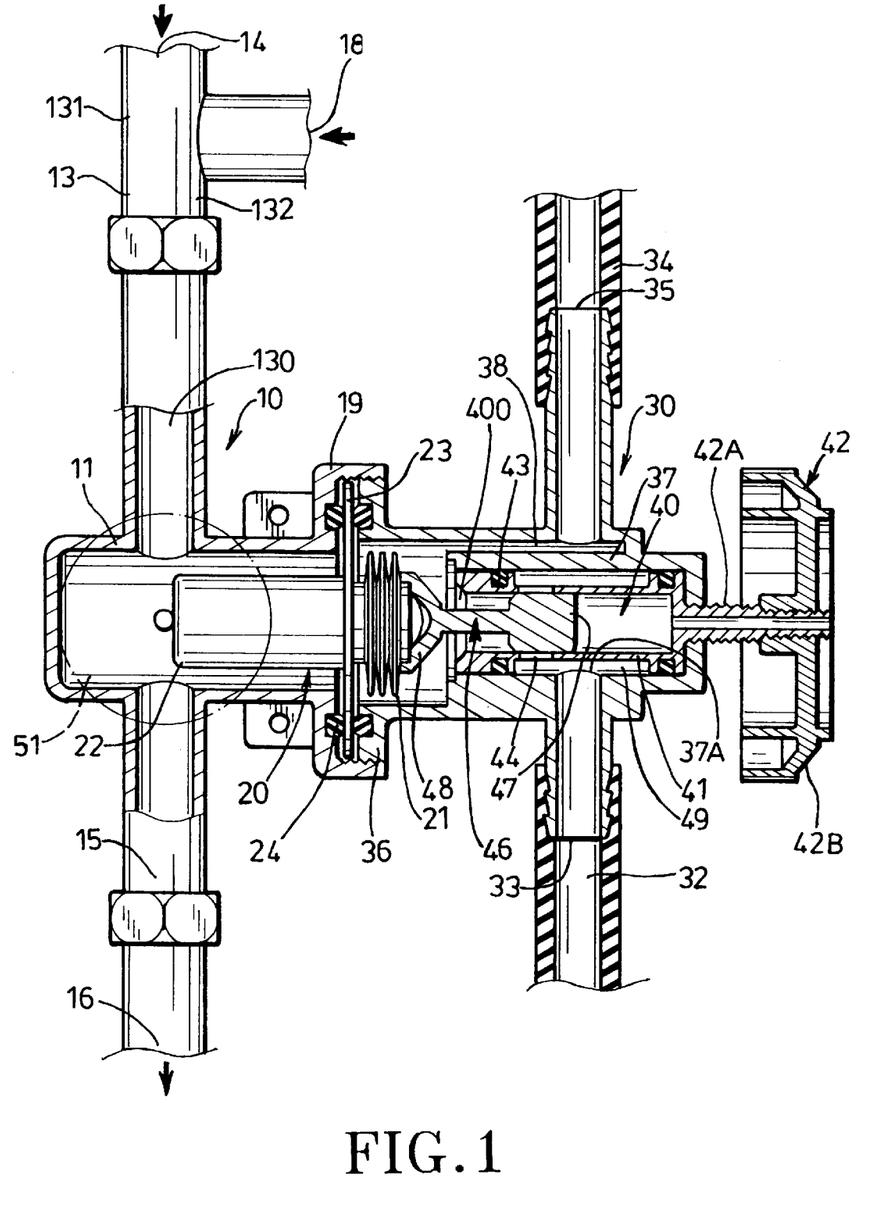
FIG. 1 is a sectional view of a first preferred embodiment of a fluid temperature control apparatus according to this invention.
Figure 2:
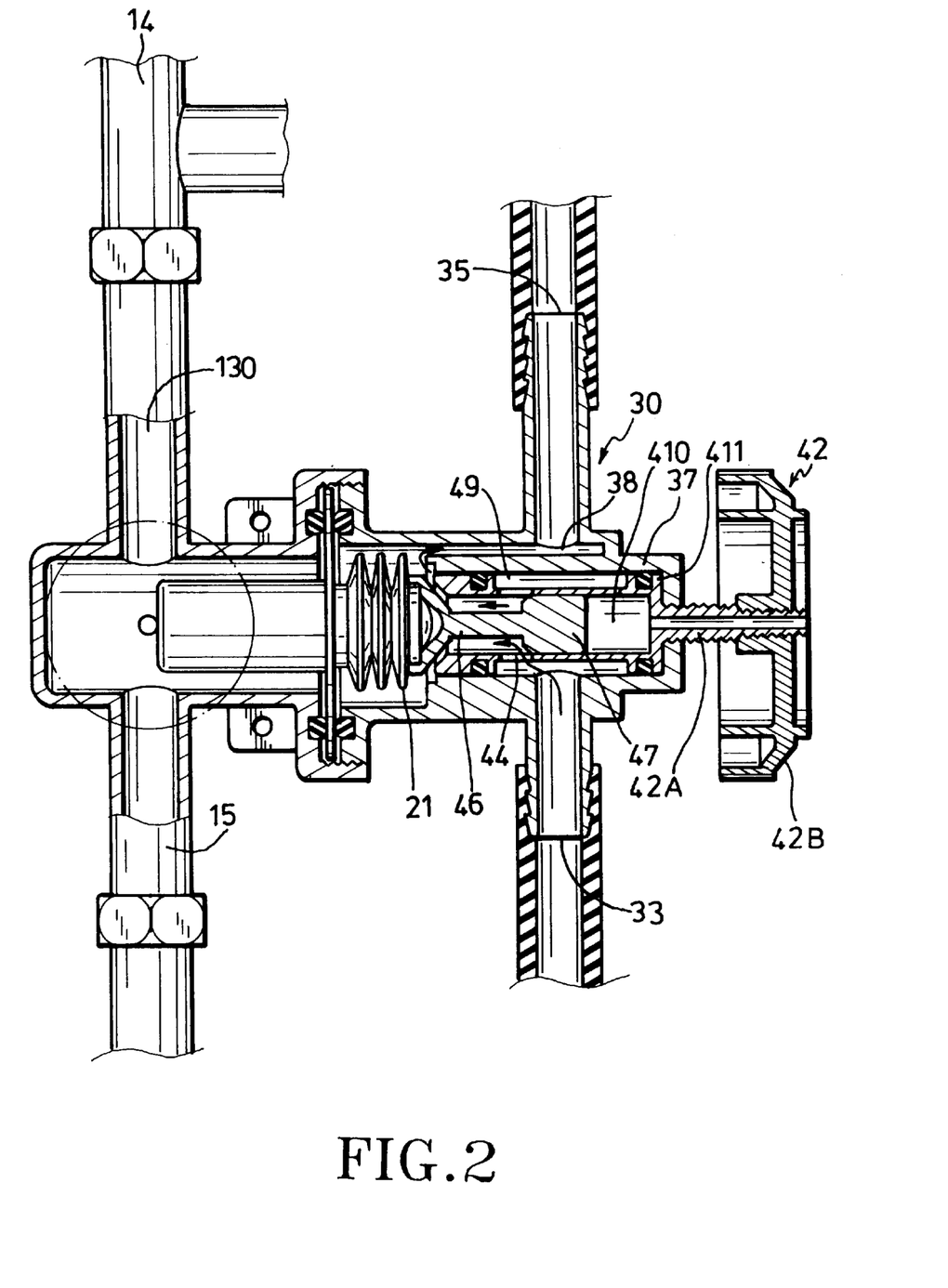
FIG. 2 is a sectional view of the first preferred embodiment, illustrating how cold fluid from a cold fluid source enters into a second housing portion.

Referring to FIGS. 1 and 2, the first preferred embodiment of an apparatus for controlling fluid temperature is shown to include a housing 10, a valve assembly 40, and a temperature responsive member 20.

As illustrated, the housing 10 includes a cylindrical first housing portion 11, a cylindrical second housing portion 30, and a partition 23 for isolating the second housing portion 30 from the first housing portion 11. The first housing portion 11 has a first fluid inlet 130 that is connected to a hot fluid source 14, and a first fluid outlet 15 for releasing fluid therefrom via a water tap 16. The second housing portion 30 has a second fluid inlet 33 that is connected to a cold fluid source 32, and a second fluid outlet 35 that is connected to the first fluid inlet 130 of the first housing portion 11 by a connecting pipe 34.

The valve assembly 40 includes a tubular valve seat 41 and a piston 46. The tubular valve seat 41 is disposed in the second housing portion 30 and is formed with an axially extending piston receiving space 410 with an open end 400 that is spaced from the partition 23 and that is fluidly communicated with the second fluid outlet 35 of the second housing portion 30. The piston 46 has an enlarged head portion 47 that extends slidably into the piston receiving space 410 of the valve seat 41, and a restricted actuated portion 48 that extends out of the valve seat 41 via the open end 400 of the valve seat 41. The tubular valve seat 41 has a radial valve opening 44 that is fluidly communicated with the second fluid inlet 33 of the second housing portion 30. The piston 47 is movable relative to the tubular valve seat 41 between a first position, wherein the head portion 47 blocks fully the valve opening 44 of the tubular valve seat 41 (see FIG. 1) so as to prevent the cold fluid from the cold fluid source 32 from flowing into the second fluid outlet 35, and a second position, wherein the head portion 47 ceases to block the valve opening 44 (see FIG. 2) so as to permit maximum cold fluid flow from the cold fluid source 32 to the second fluid outlet 35 via the open end 400 of the tubular valve seat 41.

The temperature responsive member 20 is mounted on the partition 23, and has a fluid contacting portion 22 that extends into the first housing portion 11, and a volume-variable piston actuating portion 21 that extends into the second housing portion 30 and that is connected to the actuated portion 48 of the piston 46. The piston actuating portion 48 is capable of expanding so as to move the piston 47 relative to the tubular valve seat 41 by a distance corresponding to the temperature of fluid entering into the first housing portion 11 via the first fluid inlet 130 for controlling the cold fluid flow through the second fluid outlet 35 and into the first housing portion 11 to control, in turn, the temperature of fluid that flows out of the first fluid outlet 15.

The first preferred embodiment further includes a mixing pipe 13 which has a first inlet section 131 connected to the hot fluid source 14, a second inlet section 18 connected to the second fluid outlet 35 via the connecting pipe 34, and an outlet section 132 connected to the first fluid inlet 130 of the first housing portion 11. The second housing portion 30 is formed with a tubular valve seat retainer 37 to receive the tubular valve seat 41 slidably and sealingly therein. The tubular valve seat retainer 37 is preferably formed with a radial inlet port 37A that communicates fluidly the valve opening 44 and the second fluid inlet 33 of the second housing portion 30. The tubular valve seat 41 has a closed end 411 opposite to the open end 400 thereof. The valve assembly 40 further includes an adjustment member 42 which is mounted on the closed end 411 of the tubular valve seat 41 and which extends out of the tubular valve seat retainer 37 for manually moving the valve seat 41 in the tubular valve seat retainer 37 to adjust the position of the valve opening 44 relative to the head portion 47 of the piston 46.

In the first preferred embodiment, the adjustment member 42 includes an operating shaft 42A which is mounted threadedly on the valve seat retainer 37 and which has an inner end mounted on the closed end 411 of the valve seat 41, and an outer end exposed outwardly of the valve seat retainer 37. An operating knob 42B is mounted on the outer end of the operating shaft 42A so as to facilitate turning of the latter in order to move the valve seat 41 relative to the head portion 47 of the piston 46. The valve seat 41 has an outer wall surface that forms an annular clearance 49 with an inner wall surface of the valve seat retainer 37. The annular clearance 49 is in fluid communication with the inlet port 37A of the valve seat retainer 37 and the valve opening 44 of the valve seat 41. The outer wall surface of the valve seat 41 is provided with a pair of sealing rings 43 adjacent to the opposite ends of the clearance 49 and in sealing contact with the inner wall surface of the valve seat retainer 37. The valve seat retainer 37 has an outer wall surface that forms a passage 38 with an inner wall surface of the second housing portion 30. The passage 38 is in fluid communication with the second fluid outlet 35 of the second housing portion 30 such that the cold fluid which flows out of the open end 400 of the valve seat 41 can reach the second fluid outlet 35.

In the first preferred embodiment, the first housing portion 11 has a first mounting part 19, and the second housing portion 30 has a second mounting part 36 mounted threadedly to the first mounting part 19. The partition 23 is retained between the first and second mounting parts 19, 36. A pair of sealing members 24 are disposed on opposite sides of the partition 23 in sealing contact with a respective one of the first and second mounting parts 19, 36. The piston actuating portion 21 of the temperature responsive member 20 is a bellows-type portion, while the fluid contacting portion 22 is a cylindrical tube filled with a gas that expands to consequently expand the piston actuating portion 21 according to the temperature of the fluid entering into the first housing 11 via the first fluid inlet 130, thereby permitting automatic control of the temperature of fluid flowing out of the first fluid outlet 15.

Figure 3:
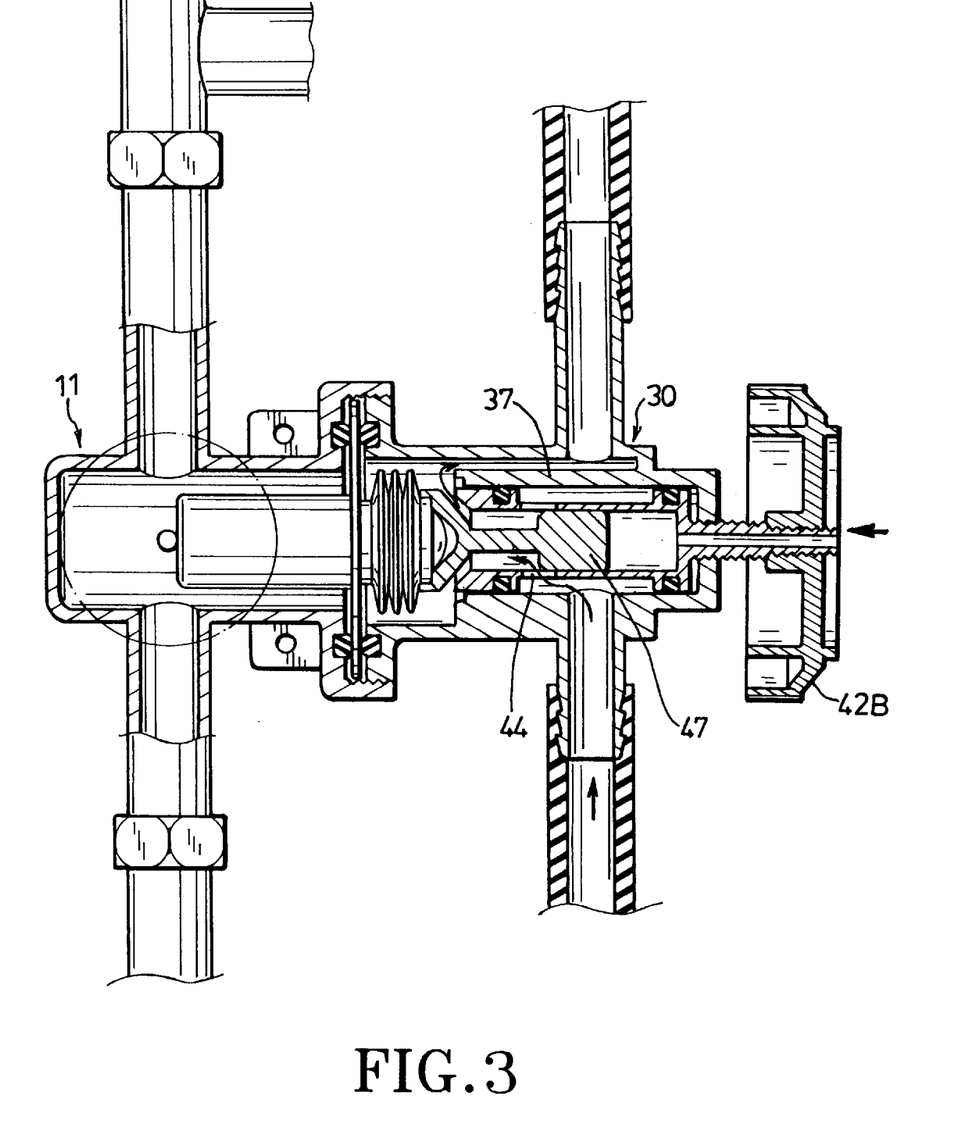
FIGS. 3 and 4 are sectional views of the first preferred embodiment, illustrating how a valve assembly installed therein is actuated in order to limit the amount of the cold fluid that flows into a first housing portion from the second housing portion.
Figure 4:
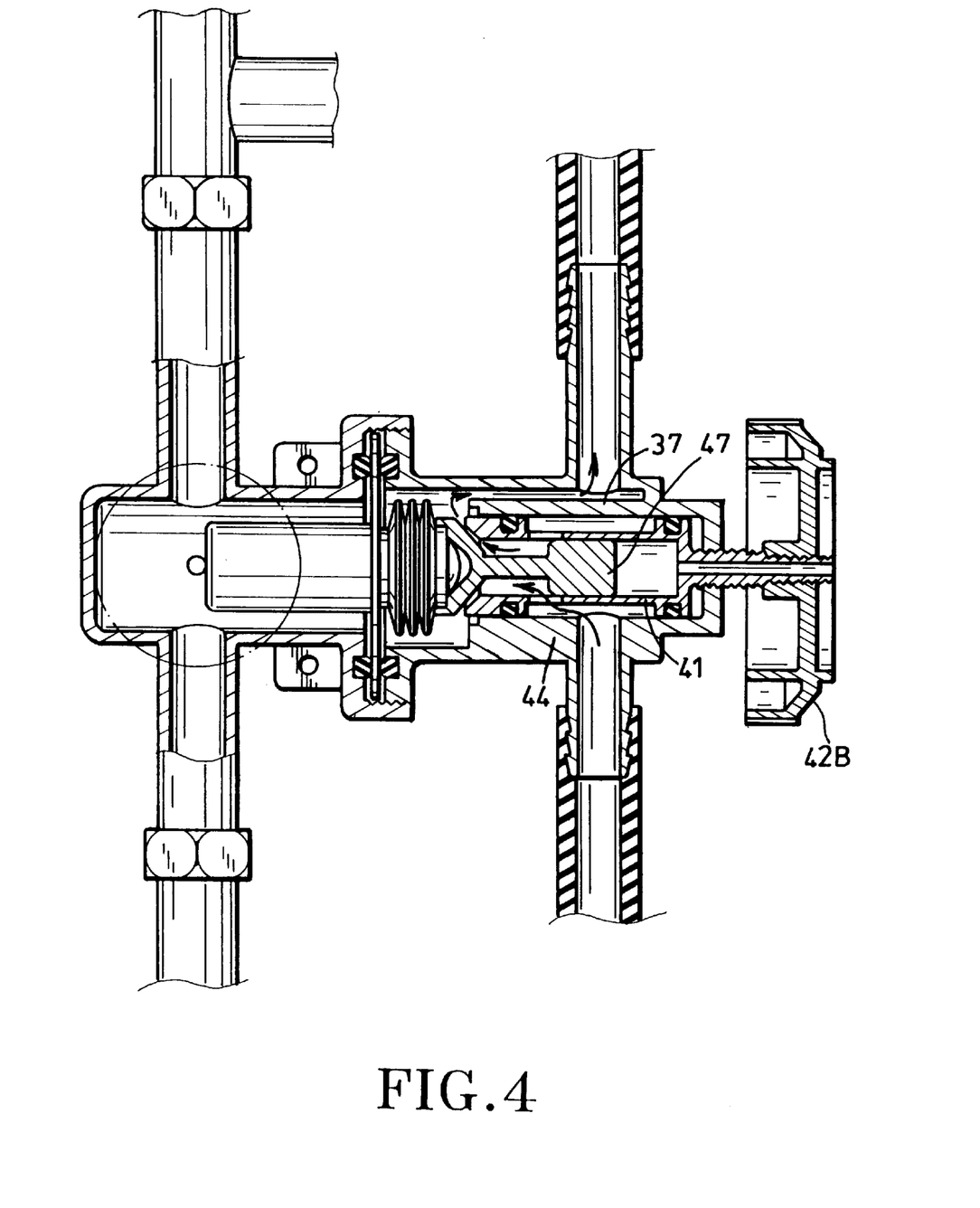

Referring to FIGS. 3 and 4, rotation of the operating knob 42B relative to the valve seat retainer 37 results in movement of the valve opening 44 relative to the head portion 47 of the piston 46, thereby adjusting the initial size of the valve opening 44 that is blocked by the head portion 47 and therefore limiting and consequently adjusting the cold fluid flow from the second housing portion 30 into the first housing portion 11. Preferably, a known temperature indicator 51 (see FIG. 1) is installed on the housing 10 to facilitate operation of the knob 42B to ease attainment of the desired fluid temperature at the first fluid outlet 15.

Figure 5:
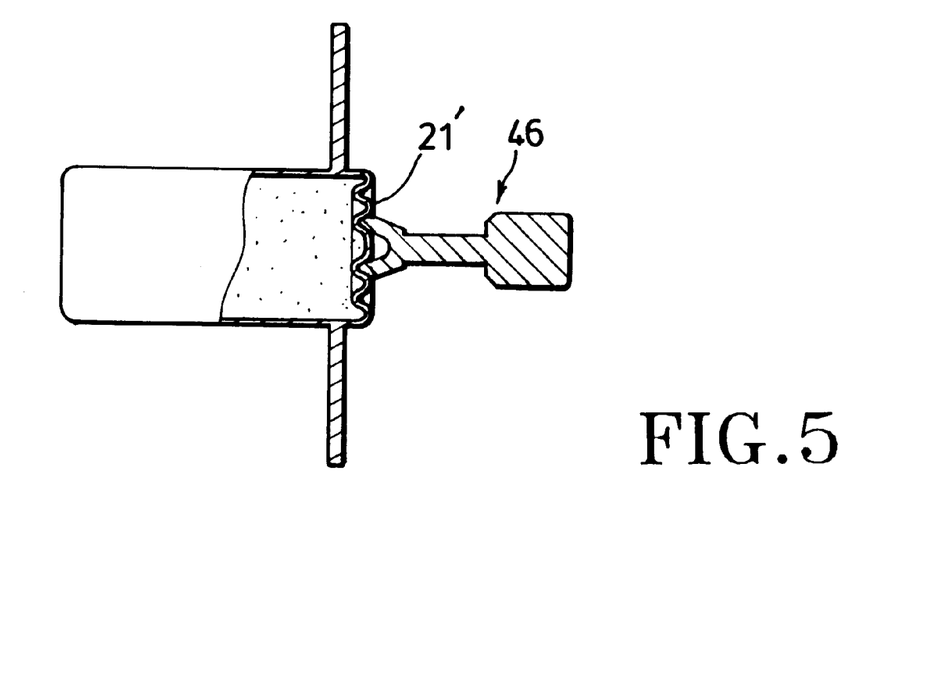
FIGS. 5 and 6 respectively illustrate modified temperature responsive members that can be employed in the first preferred embodiment.
Figure 6:
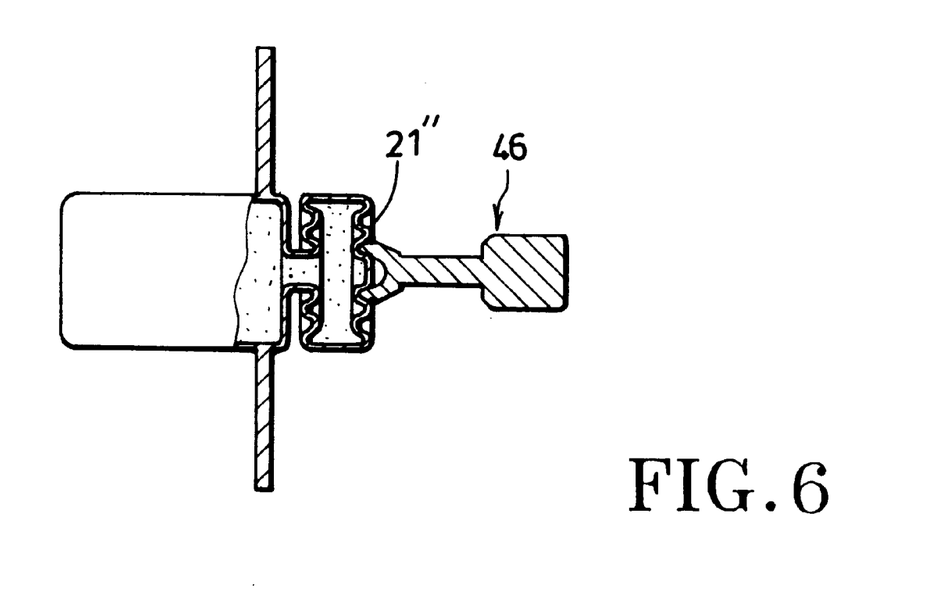

FIGS. 5 and 6 show two modified volume-variable piston actuating portions 21', 21" that can be used instead of the bellow-type portion of the first preferred embodiment to achieve the same effect.

Figure 7:
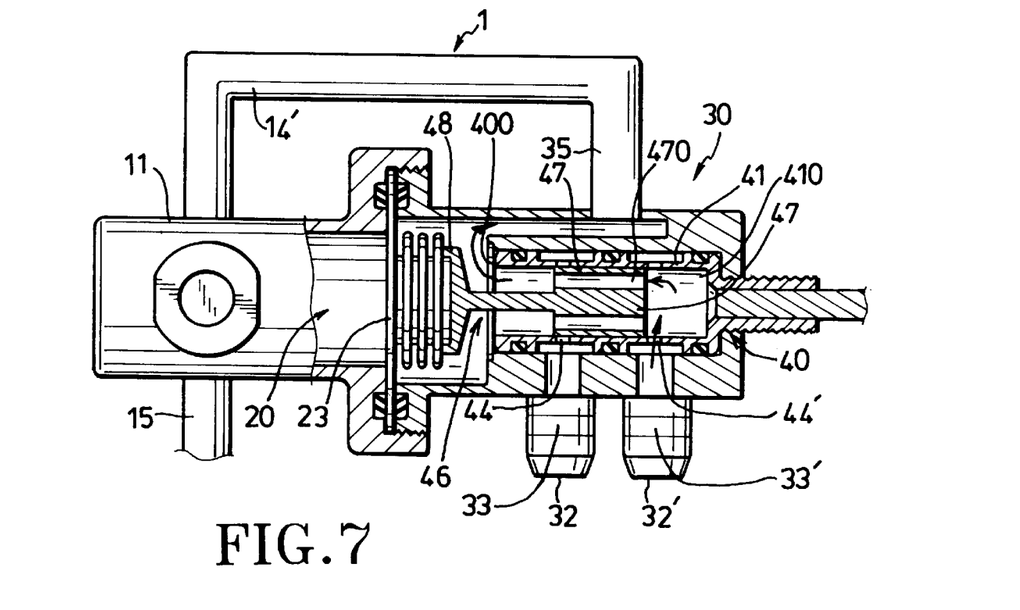
FIG. 7 is a partly sectional, schematic side view of a second preferred embodiment of a fluid temperature control apparatus according to this invention.

Referring to FIG. 7, the second preferred embodiment of an apparatus according to this invention is shown to also include a housing 1, a valve assembly 40, and a temperature-responsive member 20. As illustrated, the housing 1 includes a first housing portion 11 with a first fluid inlet 14' and first fluid outlet 15, and a second housing portion 30. The second housing portion 30 has a second fluid inlet 33 connected to a cold fluid source 32, a third fluid inlet 33' connected to a hot fluid source 32', and a second fluid outlet 35 connected to the first fluid inlet 14' of the first housing portion 11. A partition 23 isolates the second housing portion 30 from the first housing portion 11.

The valve assembly 40 includes a tubular valve seat 41 disposed in the second housing portion 30, and a piston 46. The valve seat 41 is formed with an axially extending piston receiving space 410 with an open end 400 that is spaced from the partition 23 and that is fluidly communicated with the second fluid outlet 35, a radial first valve opening 44 that is fluidly communicated with the second fluid inlet 33, and a radial second valve opening 44' that is fluidly communicated with the third fluid inlet 33'. The piston 46 has an enlarged head portion 47 that extends slidably into the piston receiving space 410 of the valve seat 41 and that is formed with two axially extending fluid passages 470, and a restricted actuated portion 48 that extends out of the valve seat 41 via the open end 400. The piston 46 is movable relative to the valve seat 41 between a first position, wherein the head portion 47 blocks fully the first valve opening 44 and ceases to block the second valve opening 44' so as to prevent the cold fluid from the cold fluid source 32 from flowing into the piston receiving space 410 of the valve seat 41 and to permit hot fluid from the hot fluid source 32' to flow into the piston receiving space 410 and out of the second fluid outlet 35, and a second position, wherein the head portion 47 blocks fully the second valve opening 44' and ceases to block the first valve opening 44 so as to prevent the hot fluid from the hot fluid source 32' from flowing into the piston receiving space 410 and to permit the cold fluid from the cold fluid source 32 to flow into the piston receiving space 410 and out of the second fluid outlet 35. The temperature-responsive member 20 is mounted on the partition 23 in the same manner as the first preferred embodiment.

Figure 8:
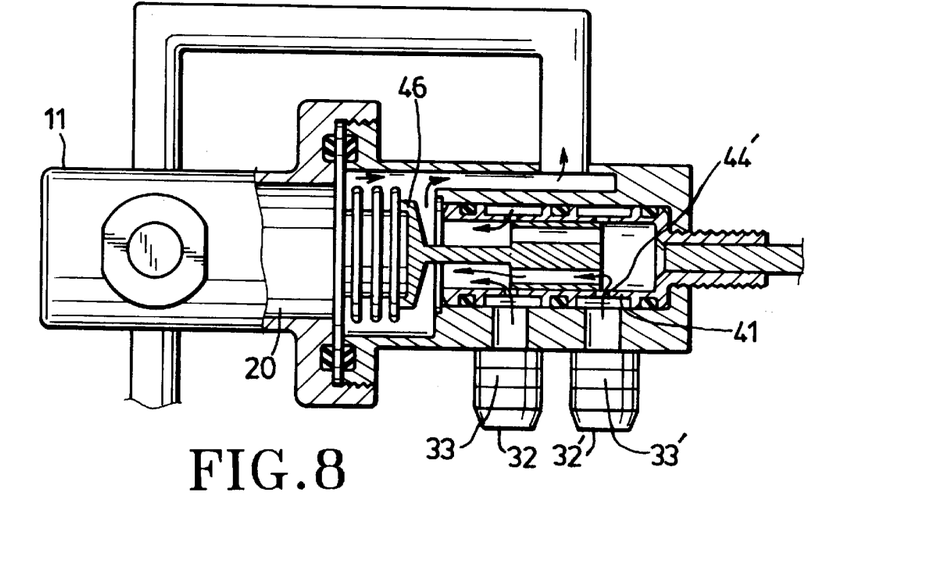
FIGS. 8 and 9 are partly sectional, schematic side views of the second preferred embodiment, illustrating how the valve assembly employed therein is adjusted in order to control the flow of hot and cold fluid from hot and cold fluid sources into the first housing portion via the second housing portion.
Figure 9:
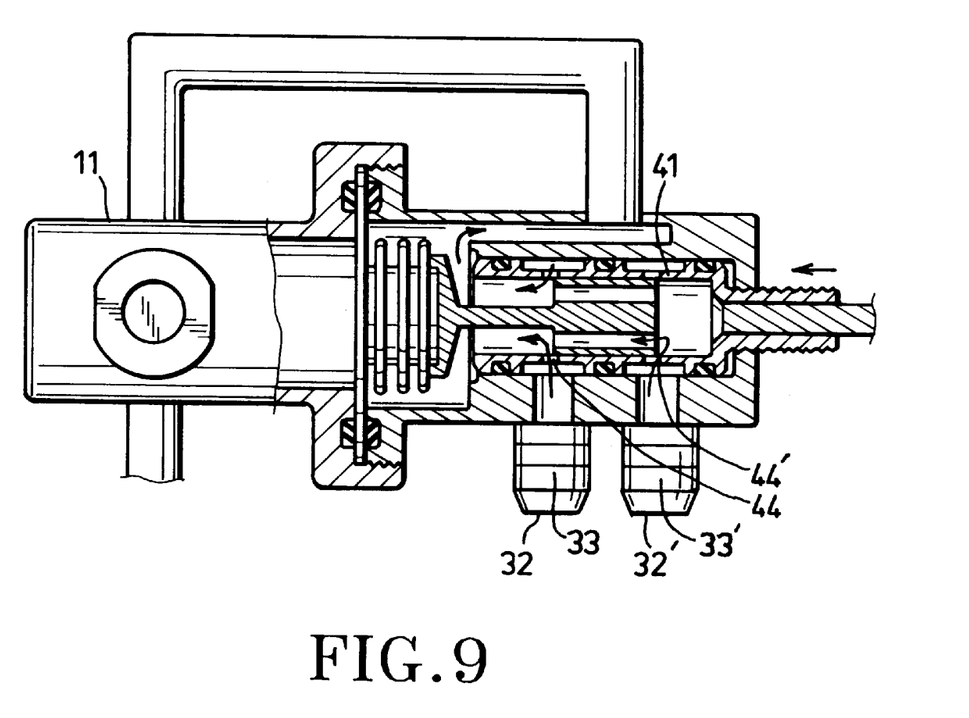

FIGS. 8 and 9 respectively illustrate how the valve seat 41 is adjusted relative to the piston 46 in order to control the flow of hot and cold fluid from the hot and cold water sources 32, 32' into the first housing portion 11 via the first and second radial openings 44, 44' of the valve seat 41. The second preferred embodiment provides the same features as those of the first preferred embodiment.

With this invention thus explained, it is apparent that numerous modifications and variations can be made without departing from the scope and spirit of this invention. It is therefore intended that this invention be limited only as indicated in the appended claims.

I claim:

1. An apparatus for controlling fluid temperature, comprising:
   a housing including:
      a first housing portion having a first fluid inlet adapted to be connected to a hot fluid source, and a first fluid outlet,
      a second housing portion having a second fluid inlet adapted to be connected to a cold fluid source, and a second fluid outlet connected to said first fluid inlet, and
      a partition for isolating said second housing portion from said first housing portion;
   a valve assembly including
      a tubular valve seat disposed in said second housing portion and formed with an axially extending piston receiving space with an open end that is spaced from said partition and that is fluidly communicated with said second fluid outlet, and a radial valve opening that is fluidly communicated with said second fluid inlet, and
      a piston having an enlarged head portion that extends slidably into said piston receiving space of said valve seat, and a restricted actuated portion that extends out of said valve seat via said open end, said piston being movable relative to said valve seat between a first position, where said head portion blocks fully said valve opening so as to be adapted to prevent cold fluid from the cold fluid source from flowing to said second fluid outlet, and a second position, where said head portion ceases to block said valve opening so as to be adapted to permit maximum cold fluid flow from the cold fluid source to said second fluid outlet via said open end of said valve seat; and
   a temperature responsive member mounted on said partition, and having a fluid contacting portion that extends into said first housing portion, and a volume-variable piston actuating portion that extends into said second housing portion and that is connected to said actuated portion of said piston, said piston actuating portion being capable of expanding so as to move said piston relative to said valve seat by a distance corresponding to temperature of fluid entering into said first housing portion via said first fluid inlet for controlling the cold fluid flow through said second fluid outlet and into said first housing portion to control, in turn, temperature of fluid flowing out of said first fluid outlet.

2. The apparatus as defined in claim 1, further comprising a mixing pipe having a first inlet section adapted to be connected to the hot fluid source, and a second inlet section connected to said second fluid outlet, and an outlet section connected to said first fluid inlet.

3. The apparatus as defined in claim 1, wherein said second housing portion is formed with a tubular valve seat retainer therein, said valve seat being slidably and sealingly disposed in said valve seat retainer, said valve seat retainer being formed with a radial inlet port that communicates fluidly said valve opening and said second fluid inlet.

4. The apparatus as defined in claim 3, wherein said valve seat has a closed end opposite to said open end, said valve assembly further including an adjustment member mounted on said closed end of said valve seat and extending out of said valve seat retainer for moving said valve seat in said valve seat retainer to adjust position of said valve opening relative to said head portion of said piston.

5. The apparatus as defined in claim 4, wherein said adjustment member includes an operating shaft mounted threadedly on said valve seat retainer and having an inner end connected to said closed end of said valve seat, and an outer end provided with an operating knob.

6. The apparatus as defined in claim 3, wherein said valve seat has an outer wall surface that forms an annular clearance with an inner wall surface of said valve seat retainer, said annular clearance communicating fluidly said inlet port and said valve opening.

7. The apparatus as defined in claim 6, wherein said outer wall surface of said valve seat is provided with a pair of sealing rings adjacent to opposite ends of said annular clearance and in sealing contact with said inner wall surface of said valve seat retainer.

8. The apparatus as defined in claim 3, wherein said valve seat retainer has an outer wall surface that forms a passage with an inner wall surface of said second housing portion and that is fluidly communicated with said second fluid outlet so that the cold fluid flowing out of said open end of said valve seat can reach said second fluid outlet.

9. The apparatus as defined in claim 1, wherein said first housing portion has a first mounting part, said second housing portion having a second mounting part mounted to said first mounting part, said partition being retained between said first and second mounting parts.

10. The apparatus as defined in claim 9, wherein said housing further includes a pair of sealing members disposed on opposite sides of said partition and in sealing contact with a respective one of said first and second mounting parts.

11. The apparatus as defined in claim 1, wherein said piston actuating portion of said temperature responsive member is a bellows-type portion, said temperature-responsive member being filled with a gas that expands to consequently expand said piston actuating portion according to the temperature of the fluid entering into said first housing via said first fluid inlet.

12. An apparatus for controlling fluid temperature, comprising:

a housing including
   a first housing portion having a first fluid inlet and first fluid outlet,
   a second housing portion having a second fluid inlet adapted to be connected to a cold fluid source, a third fluid inlet adapted to connected to a hot fluid source, and a second fluid outlet connected to said first fluid inlet, and
   a partition for isolating said second housing portion from said first housing portion;

a valve assembly including
   a tubular valve seat disposed in said second housing portion and formed with an axially extending piston receiving space with an open end that is spaced from said partition and that is fluidly communicated with said second fluid outlet, a radial first valve opening that is fluidly communicated with said second fluid inlet, and a radial second valve opening that is fluidly communicated with said third fluid inlet,
   a piston having an enlarged head portion that extends slidably into said piston receiving space of said valve seat and that is formed with at least one axially extending fluid passage, and a restricted actuated portion that extends out of said valve seat via said open end, said piston being movable relative to said valve seat between a first position, where said head portion blocks fully said first valve opening and ceases to block said second valve opening so as to be adapted to prevent cold fluid from the cold fluid source from flowing into said piston receiving space and to permit hot fluid from the hot fluid source to flow into said piston receiving space and out of said second fluid outlet, and a second position, where said head portion blocks fully said second valve opening and ceases to block said first valve opening so as to be adapted to prevent the hot fluid from the hot fluid source from flowing into said piston receiving space and to permit the cold fluid from the cold fluid source to flow into said piston receiving space and out of said second fluid outlet; and a temperature-responsive member mounted on said partition and having a fluid contacting portion that extends into said first housing portion, and a volume-variable piston actuating portion that extends into said second housing portion and that is connected to said actuated portion of the piston, said piston actuating portion being capable of expanding so as to move said piston relative to said valve seat by a distance corresponding to temperature of fluid entering into said first housing portion via said first fluid inlet for controlling flow of the hot and cold fluids through said second fluid outlet and into said first housing portion to control, in turn, temperature of fluid flowing out of said first fluid outlet.

* * * * *